United States Patent [19]
Williamson

[11] Patent Number: 6,116,519
[45] Date of Patent: Sep. 12, 2000

[54] HERBICIDE SPRAYER ASSEMBLY

[75] Inventor: John C. Williamson, Durant, Fla.

[73] Assignees: G. Marvin Brown; M. Glenn Williamson; Lisa Williamson, all of Dover, Fla.

[21] Appl. No.: 09/013,894

[22] Filed: Jan. 27, 1998

[51] Int. Cl.[7] .................................. B05B 1/20; B05B 1/28
[52] U.S. Cl. ......................... 239/168; 239/172; 239/288
[58] Field of Search ................................. 239/168, 172, 239/288, 288.3, 288.5; 172/233, 234, 264

[56] References Cited

U.S. PATENT DOCUMENTS

| | | |
|---|---|---|
| 1,462,861 | 7/1923 | Jordan . |
| 2,583,897 | 1/1952 | Smeds . |
| 3,038,665 | 5/1962 | Doerr . |
| 3,059,704 | 10/1962 | Kasatkin . |
| 3,445,961 | 5/1969 | Elsworth . |
| 3,581,993 | 6/1971 | Reams . |
| 3,683,547 | 8/1972 | Harden . |
| 3,977,605 | 8/1976 | Sheldon . |
| 4,350,294 | 9/1982 | Gaspard . |
| 4,353,505 | 10/1982 | Kinder . |
| 4,650,124 | 3/1987 | Connaughty et al. . |
| 4,736,888 | 4/1988 | Fasnacht . |
| 4,893,755 | 1/1990 | Keathley . |
| 5,139,200 | 8/1992 | Greimann et al. . |
| 5,248,090 | 9/1993 | Williamson . |

FOREIGN PATENT DOCUMENTS

| | | |
|---|---|---|
| 2 608 944 | 7/1988 | France . |
| 26 51 391 | 5/1978 | Germany . |

Primary Examiner—Andres Kashnikow
Assistant Examiner—Sean P. O'Hanlon
Attorney, Agent, or Firm—Jacobson, Price, Holman & Stern, PLLC

[57] ABSTRACT

A plurality of pivotable spray chambers are mounted on an elongated beam extending from a boom secured to a three-point trailer hitch of a tractor. Controlled herbicide spraying of the unwanted growth which occurs in the furrows between dikes in fields of strawberries, lettuce, corn, tomatoes, onions, and other crops is achieved. Each furrow is sprayed by at least two spray chambers pivotally mounted from a beam. Each spray chamber includes an open bottomed box, with each of the two spray chambers being movable towards and away from each other against the bias of springs so that varying widths of furrows between adjacent dikes are accommodated.

20 Claims, 6 Drawing Sheets

HERBICIDE SPRAYER ASSEMBLY

FIELD OF THE INVENTION

This invention relates to the field of herbicide sprayers for spraying a plurality of furrows between rows of plastic covered dikes so as to eradicate weeds growing between adjacent dikes. Two spray chambers are mounted on opposite sides of an elongated beam extending from an elongated boom secured to the rear of a tractor. Each spray chamber is pivotally mounted to accommodate differences in location and width of furrows located between adjacent rows of dikes.

BACKGROUND OF THE INVENTION

Various attempts have been made to control weeds and other unwanted growth which occurs in furrows between the dikes used for the growing of vegetables and fruits. These dikes usually are covered in plastic to limit the amount of unwanted growth on the dikes. The crops at the top of the dikes pass through slits in the plastic. The furrows between adjacent dikes are used for irrigation purposes and travel of farm equipment. Unwanted weeds grow in the furrows which compete with the food product for the nutrients and water contained in the soil.

In U.S. Pat. No. 3,581,993 to Reams, a foldable agricultural spray boom incorporates a hydraulic cylinder which causes the boom to unfold when actuated by the pressurized spray liquid. In the unfolded position, a valve establishes a fluid path through the cylinder to the boom spray nozzles.

U.S. Pat. No. 1,462,861 to Jordan and U.S. Pat. No. 4,353,505 to Kinder disclose crop sprayers with skirts to limit the spray or dust to a row of planted crops. The Kinder patent also discloses a drift-free spray apparatus adapted for movement in connection with a vehicle and includes a spray bar mounted within a bottomless, rectangular, box-type housing in communication with a fluid pump and reservoir assembly, adapted for emitting fluid in a mist configuration upon the surface to be sprayed through nozzles provided in the spray bar.

U.S. Pat. No. 3,445,961 to Elsworth, U.S. Pat. No. 3,977,605 to Sheldon, U.S. Pat. No. 4,350,294 to Gaspard, and U.S. Pat. No. 4,736,888 to Fasnacht discloses herbicide sprayers for use in planted fields. These patents include various means for protecting the crops, either by carefully limiting the spread of the herbicide spray or by shielding the crops from the spray. In the Gaspard patent, spray nozzles are disclosed as being mounted on pivoting arms including a skid which runs along a furrow. This keeps the nozzle at a constant height and allows control of the spread of the herbicide without lateral control.

In my prior patent, U.S. Pat. No. 5,248,090, herein incorporated in its entirety by reference, a plurality of spray chambers are mounted on a boom secured to a three-point trailer hitch of a tractor. Controlled herbicide spraying of the unwanted growth which occurs in the furrows between dikes in fields of strawberries, lettuce, corn, tomatoes, onions, and other crops is achieved. Each spray chamber includes two overlapping sections which are movable towards and away from each other against the bias of springs so that varying widths of furrows between adjacent dikes are accommodated. In addition, an entire spray chamber is laterally adjustable to accommodate varying distances between adjacent furrows as is encountered due to "blow outs" of dikes due to over-watering or storm conditions to cause partial collapse of a dike.

An attempt is made in the '090 patent to limit the spray of herbicide to vegetation located in the furrow between dikes so as to eliminate any accidental spraying of the adjacent crops located on top of the dikes. This would avoid the drift of herbicide during high wind conditions which could accidentally kill the crops, and therefore spraying may occur at any time, avoiding the necessity to wait for good weather for herbicide spraying.

The boom onto which the plurality of spray chambers are mounted includes lift cylinders to elevate sections of the boom for higher speed travel when not spraying. Each of the spray chambers includes a chain link connection to the boom at the rear of the spray chamber to limit the extent of drop of the spray chambers when lifting the boom sections. In addition, each spray chamber includes a slidable connection to the boom at the front of each spray chamber for a lateral adjustment of the spray chambers. The chain link connection also prevents excessive drop of the rear of the spray chambers when passing over a ditch caused by over-watering of the field, or other adverse conditions.

The lateral and height positioning of spray nozzles within each spray chamber are adjustable. By these adjustments, an attempt is made to have accurate herbicide spraying of the furrows of a field.

SUMMARY OF THE INVENTION

It is an object of the present invention to provide rigid spray chambers by a square or rectangular shaped box with two spray chambers being pivotally mounted on an elongated beam extending from a laterally extending boom connected to a three point trailer hitch of a tractor. By the interconnected, rigid side walls of the spray chambers, chemical agents may be sprayed into the furrows of a farm field, directly onto the vegetation growing in the furrow without the possibility of escape of sprayed herbicide.

This object is accomplished by the use of an elongated beam having vertically extending support rods extending from the beam to support wheels. At least two spray chambers are located on each beam. The spray chambers extend laterally from the beam for a maximum coverage width of approximately 22 inches.

The spray chambers are pivotally mounted on the elongated beams and allowed to pivot through a semi-circular arc of rotation with respect to the beam against the bias force of springs anchoring the spray chambers to the elongated beam. Accordingly, the spray chambers may pivot with respect to the elongated beam upon encountering a reduced width furrow so that the two spray chambers may be moved towards the beam and be limited to a minimum coverage width of a twelve inch furrow.

When herbicide is sprayed in each of the chambers, there are no gaps in the side walls of the spray chamber to allow the escape of herbicide into the surrounding air and potentially onto the crops on the dikes adjacent to the furrows. The spraying of herbicide within a rigid side wall enclosure, provides great accuracy in moving herbicide into a specifically designated area, so as to maximize effectiveness.

Accordingly, it is an object of the present invention to provide rigid spray chambers which are pivotally mounted and biased away from each other for movement towards a centrally located beam upon encountering a reduction in width of a furrow in a farm field.

It is another object of the present invention to provide an elongated beam extending from a boom connected to a trailer hitch of a tractor with at least two spray chambers pivotally mounted on the elongated beam and biased into contact with the side walls of the furrow along which the elongated beam travels upon movement of the tractor.

It is still yet another object of the present invention to provide a herbicide sprayer assembly including rigid side wall spray chambers for specific directing of herbicide spray onto undesirable growth in the furrows of a farm field.

It is still yet another object of the present invention to provide a herbicide sprayer assembly including an elongated beam mounted on a boom carried by a tractor with the elongated beam being supported by wheels to pass through a furrow of a farm field with pivotally mounted spray chambers secured to the elongated beam and biased to encounter the side walls of the furrow so that two successive spray chambers substantially cover the entire width of the furrow in the farm field no matter what the width of the furrow.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
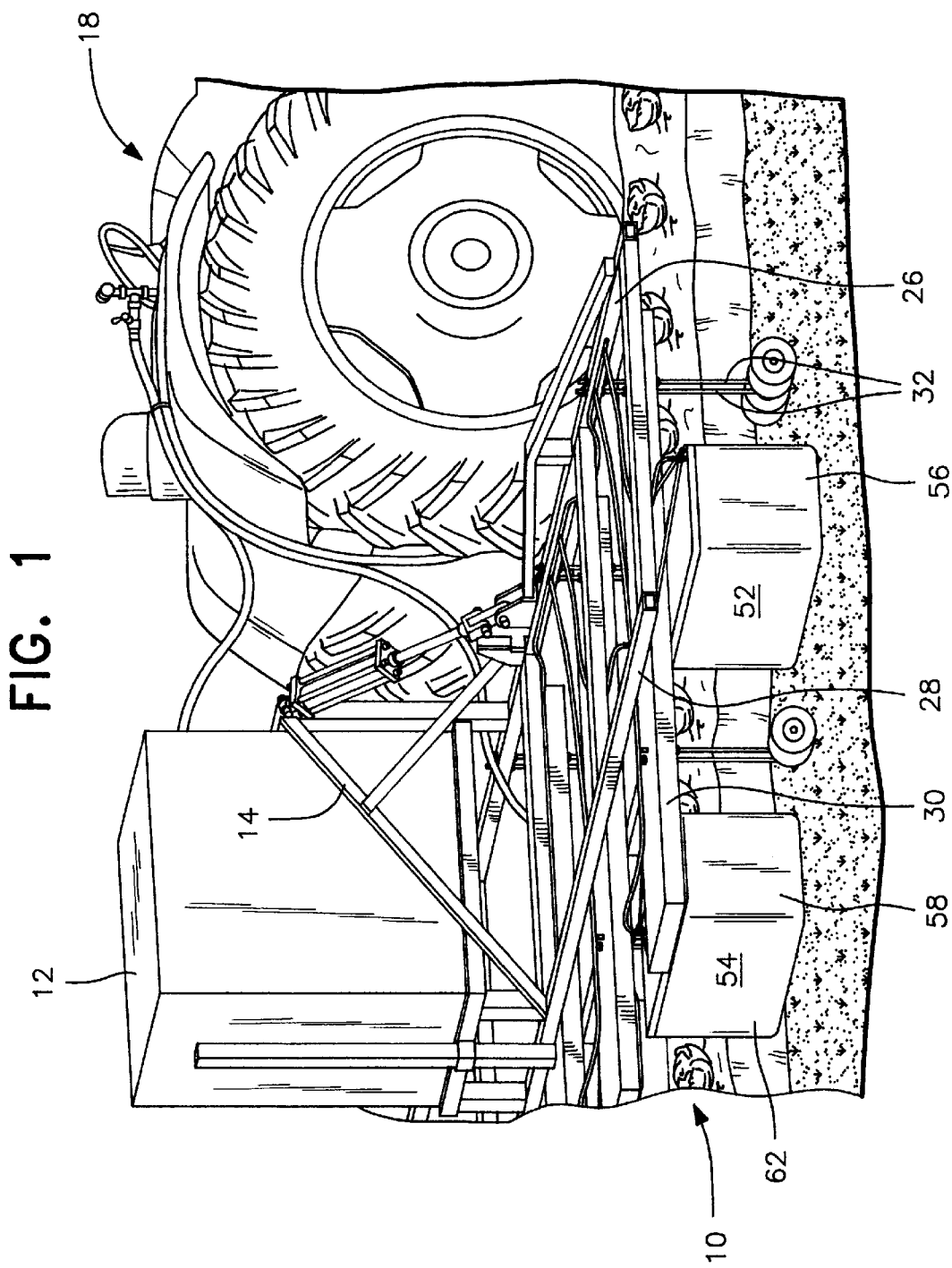
FIG. 1 is a perspective view of a tractor pulling a plurality of spray chambers mounted on elongated beams extending from boom sections having a central herbicide spray housing.
Figure 2:
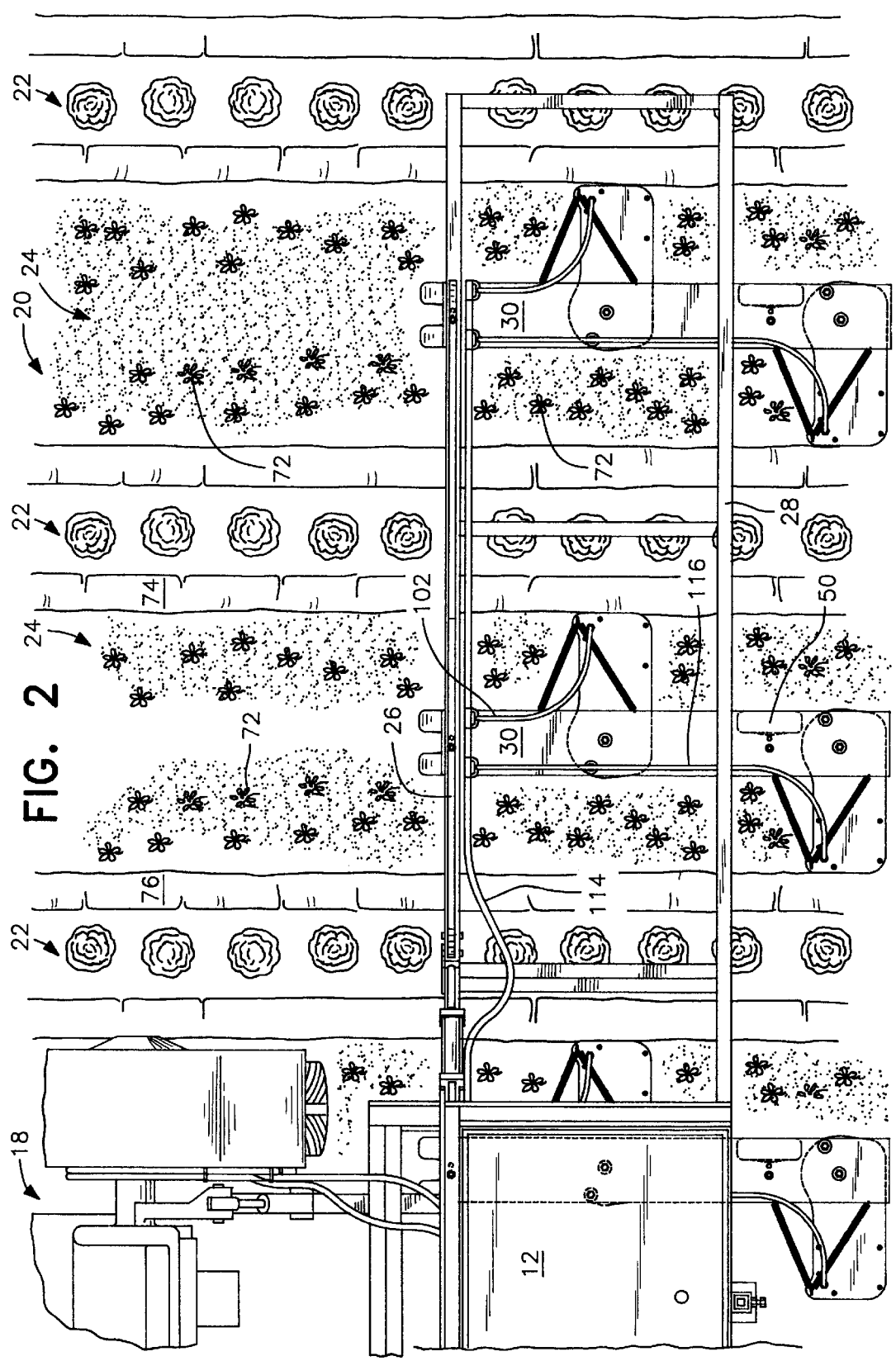
FIG. 2 is a plan view illustrating a plurality of spray chambers mounted on elongated beams extending from a boom section.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIG. 1, in particular, a herbicide sprayer assembly embodying the teachings of the subject invention is generally designated as 10. With reference to its orientation in FIG. 1, the herbicide sprayer assembly comprises a herbicide spray housing 12 mounted on a support structure 14 which includes a three point tractor hitch 16 as shown in phantom lines in FIG. 3.

The tractor hitch 16 is attached to a tractor 18 for movement through a farm field 20 having a plurality of dikes 22 with furrows 24 located in between the dikes 22. Extending from opposite sides of the herbicide spray housing 12 are boom arms 26, 28.

Extending perpendicular to the boom arms 26, 28 are a plurality of elongated beams 30. The elongated beams 30 extend from the forward boom arm 26 and extend rearwardly therefrom.

Figure 3:
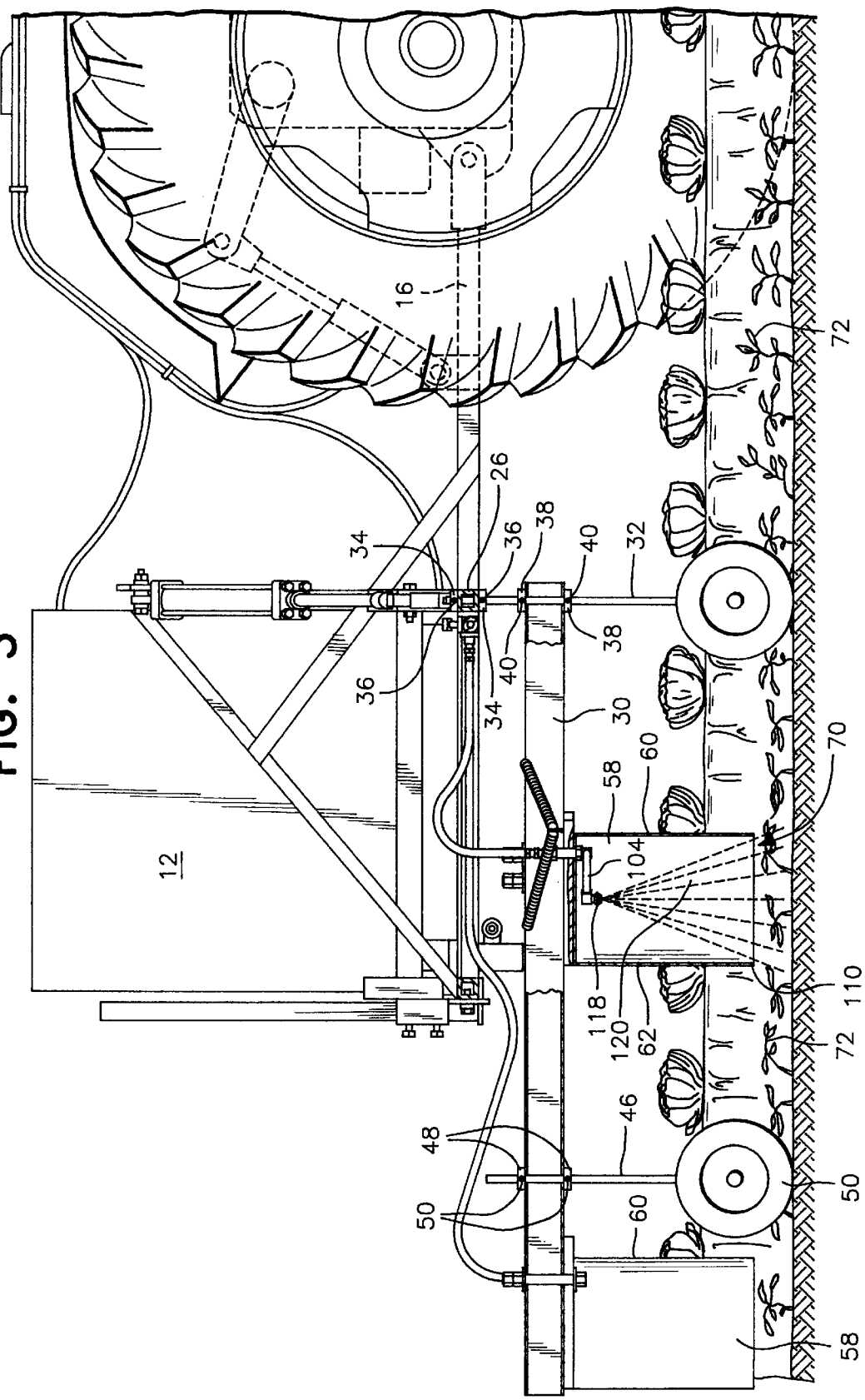
FIG. 3 is a side, partial cross-sectional view of two spray chambers mounted on an elongated beam.
Figure 5:
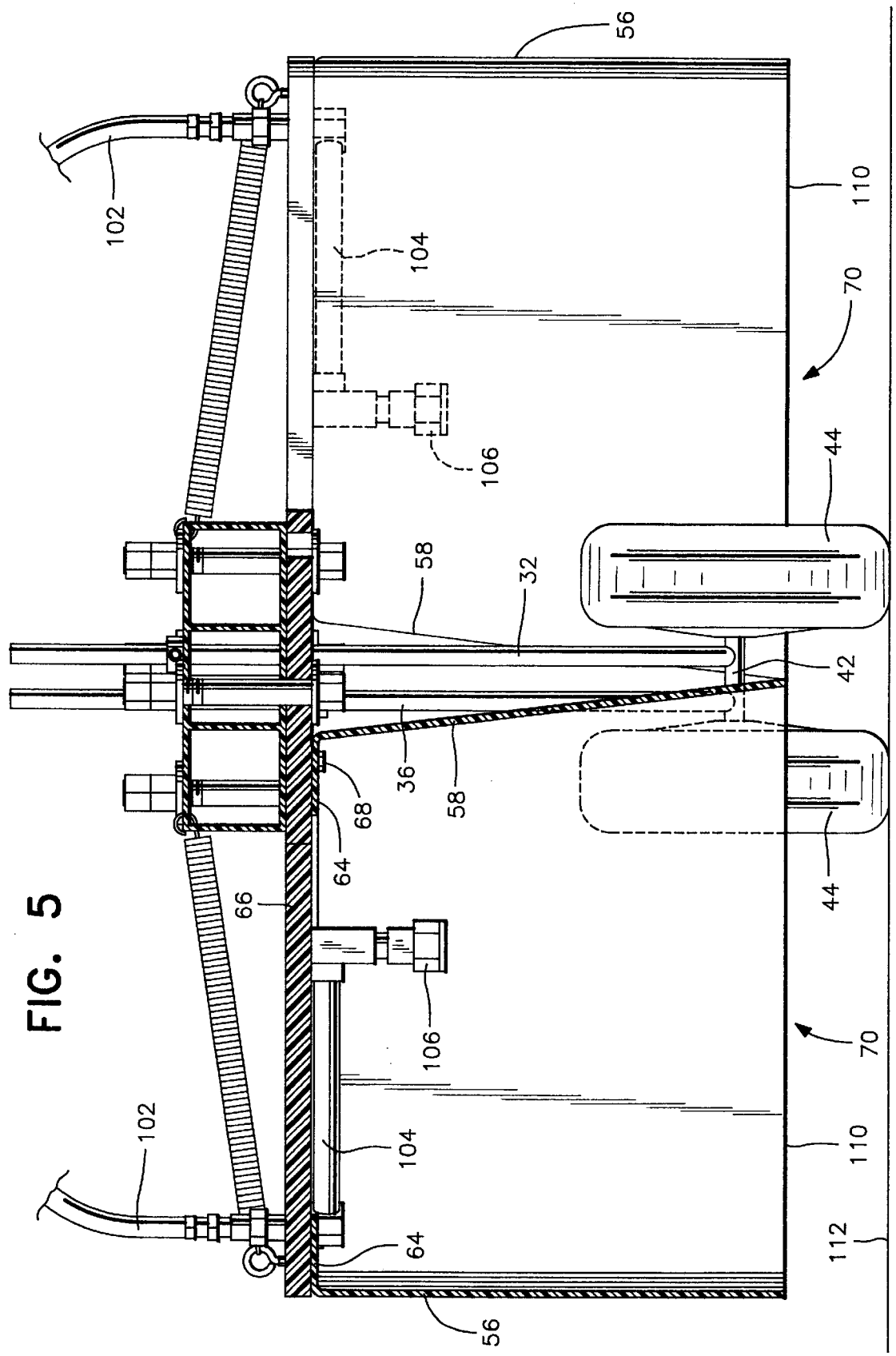
FIG. 5 is a cross-sectional view taken along line 5—5 of FIG. 4.

As shown in FIGS. 1, 3 and 5, two support rods 32 extending through boom arm 26 are held in place by two support disks 34, one positioned above and one positioned below the boom arm 26. A set screw 36 projects radially through the support disks 34 and into contact with the support rod 32 so as to fix the support rod in place.

Similarly, two support disks 38 secure the support rods 32 to the elongated beam 30 by having a radially extending set screw 40 extending therethrough and contacting the support rod 32. With one support disk 38 being positioned above and one support disk being positioned below the elongated beam 30, the position of the support rod with respect to the elongated beam 30 is fixed. The lower end of both support rods 32, terminate in an axle 42. At opposite lateral ends of the axle 42 are located rotatably mounted guide wheels 44.

Figure 6:
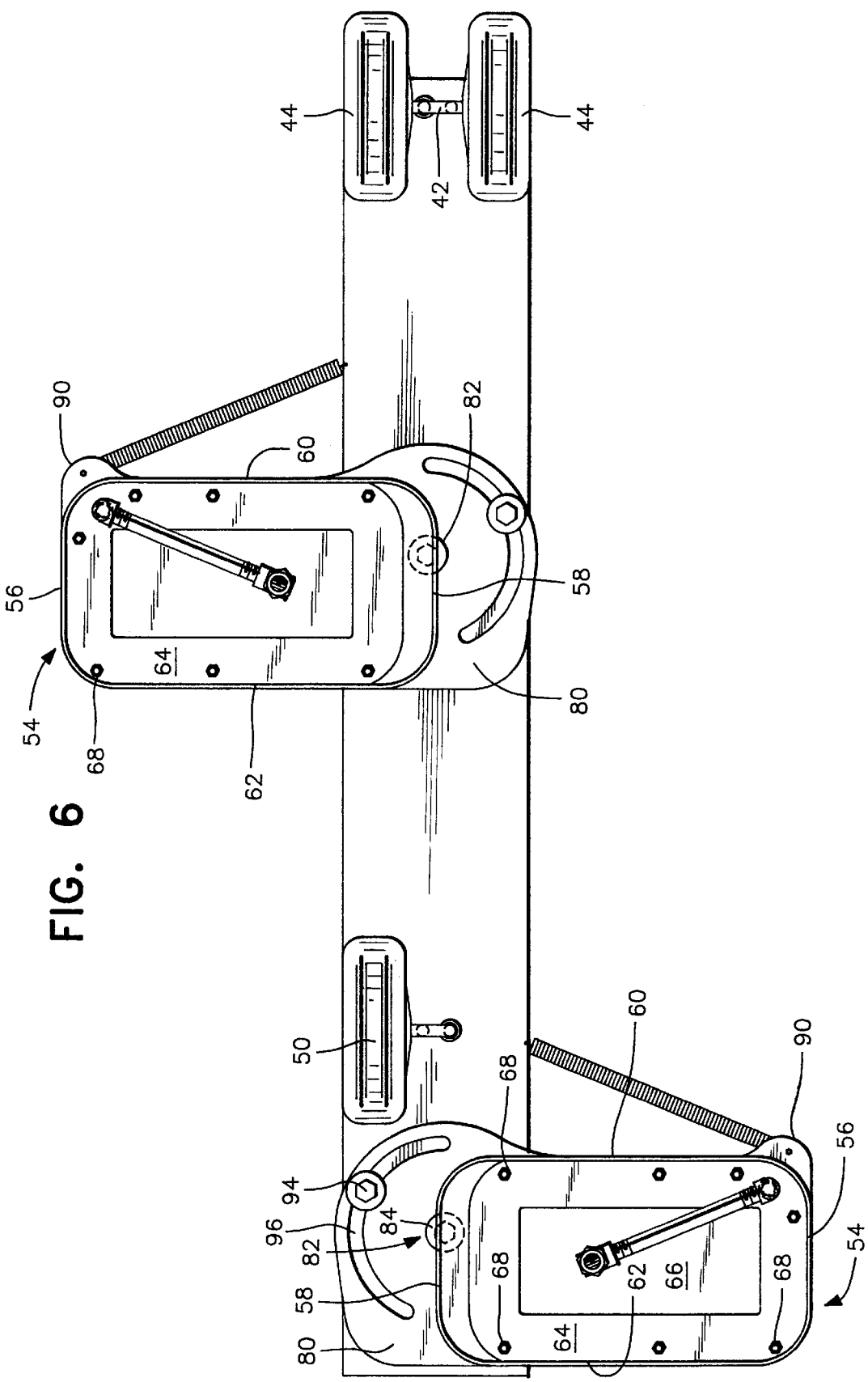
FIG. 6 is a bottom view of two spray chambers mounted on an elongated beam.

At a location spaced approximately two thirds of the length of the elongated beam 30, another two support rods 46 extend through the elongated beam 30 and are fixed to the elongated beam 30 by support disks 48 located above and below the elongated beam. Radially extending set screws 50 secure the support disks 48 to the support rods 46. At a lower end of the support rods 46 is located an interconnecting axle upon which is rotatably mounted a single support wheel 50 as shown in FIG. 6.

Located on each support beam 30 are at least one pair of spray chambers 52, 54. Each spray chamber is formed of a relatively rigid but slightly flexible plastic material including opposed lateral outer wall 56 and inner wall 58, and front and rear walls 60, 62. The front and rear walls 60, 62 and the inner wall 58 and outer wall 56 are continuous and form an enclosed spray chamber having portions 64 of the molded spray chamber extending onto a lower surface of rigid upper plate 66 of the spray chamber which seals the top of the spray chamber. A plurality of screws 68 secure the upper surface portion to the plate 66.

The front and rear walls 60, 62, two side walls 56, 58 and plate portion 66 form an enclosed spray chamber having an open bottom 70. The open bottom 70 provides for directed spray of herbicide from the spray chamber without the possibility of escape of herbicide other than through the open bottom 70. Weeds 72 located in the furrows 24, are subject to contact with the sprayed herbicide so as to limit the growth or to kill the weeds 72.

The two spray chambers 52, 54 are positioned so that as they pass through a furrow 24, limited by opposed side walls 74, 76 of the furrow, the herbicide spray from the spray chambers will be able to cover all of the surface area between the opposed side wall 74, 76 of the furrow, up to a maximum preferred width of 22 inches and down to a minimum preferred width of 12 inches. The preferred dimensions of the spray chamber are approximately eight inches wide by thirteen inches long. Of course, the range of widths of furrows that may be accommodated may be altered depending upon the overall size of the spray chambers and their positioning on the elongated beam.

Figure 4:
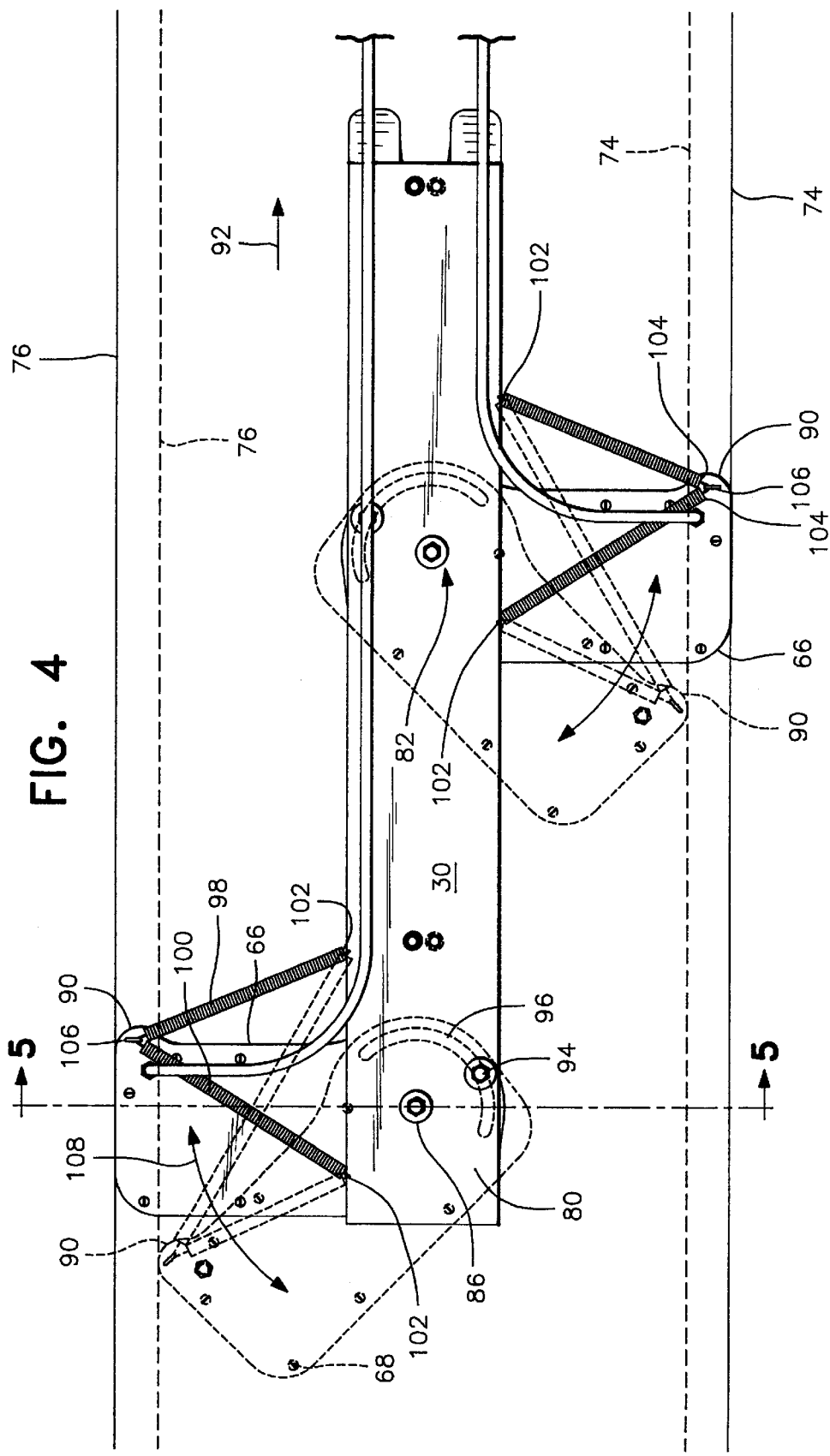
FIG. 4 is a detailed view of the pivoted mounting of two spray chambers moving towards and away from an elongated beam.

The spray chambers are capable of accommodating varying and various widths of furrows by the pivotal mounting of the spray chambers 52, 54 on the elongated beam 30. As shown in FIGS. 4 and 6, the plate 66 to which the upper portion 64 of the spray chambers is secured by nuts and bolts 68, includes a projected area 80 which extends beyond the portion where upper portion 64 of the spray chamber is connected to the plate 66.

As best shown in FIG. 6, this portion 80 includes a nut and bolt assembly 82 having a washer 84 located below the elongated beam 30 and a washer 86 located above the elongated beam 30. This allows the securing of the spray chambers to the elongated beam but allows pivotal movement of the spray chambers with respect to the elongated beam.

The pivotal movement of the spray chambers is accomplished, as shown in FIG. 4, by a rounded edge portion 90 of the portion 80 of the plate 66, engaging the furrow wall 74 or 76 when the total width of the furrow is less than 22 inches, for example. As shown in solid lines, the separation between the maximum width of the side walls 74, 76 of the furrow indicated by solid lines are spaced 22 inches apart. However, when the width of the furrow is less than 22 inches apart, in this exemplary embodiment, as shown by dashed lines 74, 76, the curved surface 90 on a leading edge of the portion 80 of plate 66 encounters the dashed lines of furrow side walls 74, 76 as the elongated beam is moved in the direction of arrow 92.

Upon this contact, the spray chambers are forced rearwardly, as shown in dotted lines in FIG. 4, as guided by the shaft of a bolt 94 riding in an arched cam groove 96 which is cut in the plate 66. The shaft of bolt 94 riding in the cam groove 96 helps stabilize the movement of the spray chambers about the pivot provided by bolt assembly 82.

In addition, two relaxed springs 98, 100, as shown in solid lines in FIG. 4, are anchored at one end 102 to the elongated beam 30. The opposite ends 104 are secured to an eye hook 106 located on the plate 66, adjacent to the curved edge 90.

Upon pivoted movement of the spray chamber to the position shown in dashed lines in FIG. 4 as indicated by the left side of arrow 108, the springs 98, 100 are stretched to the position shown in dashed lines by the force of curved edge 90 contacting the furrow side walls 74, 76, shown in dashed lines. However, whenever the width between the sidewalls increases, which includes the possibility of only one spray chamber having a lesser separation of edge 90 from the elongated beam 30 as compared to the other spray chamber, the bias force of the springs 98, 100 will tend to move the spray chambers to the right of arrow 108.

Therefore, as a tractor moves through a field, herbicide conveyed through main conduit 114 is connected to feed lines 116 which extend through the plate 66 of each spray chamber. In the spray chamber, a conduit 104 feeds herbicide to a spray nozzle 118 for spraying herbicide 120 onto the weeds 72 through the bottom opening 70 of the spray chambers. The lowermost edge 110 of the spray chambers is adjustable in height above the ground surface 112, by the relative positioning of the elongated beam 30 on the support rods 32 and 46.

If it is desired to space the lowermost edge 110 of the spray chambers further from the ground, the set screws 40 and 50 can be loosened and the elongated beam raised along the support rods 32, 46. The set screws 40, 50 can then be retightened to lock the relative height of the spray chambers with respect to the ground.

Accordingly, by the present invention, all of the surface area of a furrow between opposed side walls can be treated with herbicide no matter what the lateral width of the furrow. In addition, the height of the spray onto the weeds in the furrow can be adjusted for maximum effect.

By the present invention, increased spraying capacity is achieved at a quicker operating time due to the number of spray chambers secured to an elongated beam mounted on a tractor and which are pivotally adjustable for passage through a decreased or increased width furrow. The use of rigid enclosed spray chambers accommodating different width furrows ensures accurate spraying of the furrows.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A herbicide sprayer assembly for mounting on a laterally extending boom arm extending from a tractor, said herbicide sprayer assembly comprising:
    an elongated beam adapted to be mounted and extend rearwardly from the boom arm of the tractor, and
    at least two rigid, continuous circumferentially walled spray chambers pivotally mounted on and spaced along said elongated beam for pivotal rearward movement of the at least two spray chambers with respect to the elongated beam upon the spray chamber contacting a side wall of a furrow in a field as the elongated beam is moved through the field by the tractor.

2. A herbicide sprayer assembly for mounting on a boom arm as claimed in claim 1, wherein said elongated beam includes wheels for supporting said elongated beam as said elongated beam is moved through the field.

3. A herbicide sprayer assembly for mounting on a boom arm as claimed in claim 2, wherein said wheels are mounted on support rods extending from said elongated beam.

4. A herbicide sprayer assembly for mounting on a boom arm as claimed in claim 3, wherein a spacing of said spray chambers above the ground is changeable by moving said elongated beam up or down on said support rods.

5. A herbicide sprayer assembly for mounting on a boom arm as claimed in claim 1, wherein each spray chamber includes a front wall, a rear wall and two opposed side walls, said front, rear and side walls are continuous with each other to define an open bottom end.

6. A herbicide sprayer assembly for mounting on a boom arm as claimed in claim 5, wherein a portion of a plate interconnects said front, rear and side walls at an upper end to enclose a top of said spray chamber, said plate being pivotally mounted on said elongated beam.

7. A herbicide sprayer assembly for mounting on a boom arm as claimed in claim 6, wherein a spring is mounted extending between said elongated beam and said plate for biasing said spray chamber towards contacting a furrow side wall as the spray chamber is moved through the field.

8. A herbicide sprayer assembly for mounting on a boom arm as claimed in claim 7, wherein said plate includes a guide slot to assist in defining a path of travel of said spray chamber as the spray chamber is pivoted on said elongated beam.

9. A herbicide sprayer assembly for mounting on a boom arm as claimed in claim 8, wherein said guide slot is semi-circular shaped.

10. A herbicide sprayer assembly for mounting on a boom arm as claimed in claim 1, wherein there are two spray chambers mounted on said elongated beam so that an overall width of said two spray chambers is at least as wide as the furrow through which the tractor is moved.

11. A herbicide sprayer assembly for mounting on a laterally extending boom arm extending from a tractor, said herbicide sprayer assembly comprising:
    an elongated beam adapted to be mounted and extend rearwardly from the boom arm of the tractor, and
    two spray chambers pivotally mounted on and spaced along said elongated beam, each of said two spray chambers extending laterally from opposite sides of said elongated beam toward a respective side wall of a furrow for defining an overall width of said two spray chambers at least equal to a separation distance between the side walls of the furrow.

12. A herbicide sprayer assembly for mounting on a boom arm as claimed in claim 11, wherein said elongated beam includes wheels for supporting said elongated beam as said elongated beam is moved through the field.

13. A herbicide sprayer assembly for mounting on a boom arm as claimed in claim 12, wherein said wheels are mounted on support rods extending from said elongated beam.

14. A herbicide sprayer assembly for mounting on a boom arm as claimed in claim 13, wherein a spacing of said spray chambers above the ground is changeable by moving said elongated beam up or down on said support rods.

15. A herbicide sprayer assembly for mounting on a boom arm as claimed in claim 11, wherein each spray chamber includes a front wall, a rear wall and two opposed side walls, said front, rear and side walls are continuous with each other to define an open bottom end.

16. A herbicide sprayer assembly for mounting on a boom arm as claimed in claim 15, wherein a portion of a plate interconnects said front, rear and side walls at an upper end to enclose a top of said spray chamber, said plate being pivotally mounted on said elongated beam.

17. A herbicide sprayer assembly for mounting on a boom arm as claimed in claim 16, wherein a spring is mounted extending between said elongated beam and said plate for biasing said spray chamber towards contacting a furrow side wall as the spray chamber is moved through the field.

18. A herbicide sprayer assembly for mounting on a boom arm as claimed in claim 17, wherein said plate includes a guide slot to assist in defining a path of travel of said spray chamber as the spray chamber is pivoted on said elongated beam.

19. A herbicide sprayer assembly for mounting on a boom arm as claimed in claim 18, wherein said guide slot is semi-circular shaped.

20. A herbicide sprayer assembly for mounting on a boom arm as claimed in claim 16, wherein a carved edge of said plate is for contacting a side wall of the furrow.

* * * * *